(No Model.)

H. S. TAYLOR.
COTTON SEED CRUSHING MACHINE.

No. 374,507. Patented Dec. 6, 1887.

Witnesses

Inventor
H. S. Taylor

By his Attorneys,

UNITED STATES PATENT OFFICE.

HILLIARD SHADRACH TAYLOR, OF HOMER, LOUISIANA.

COTTON-SEED-CRUSHING MACHINE.

SPECIFICATION forming part of Letters Patent No. 374,507, dated December 6, 1887.

Application filed March 2, 1887. Serial No. 229,450. (No model.)

*To all whom it may concern:*

Be it known that I, HILLIARD SHADRACH TAYLOR, a citizen of the United States, residing at Homer, in the county of Claiborne and State of Louisiana, have invented a new and useful Improvement in Machines for Crushing Cotton-Seed, of which the following is a specification.

My invention relates to improvements in machines for crushing cotton-seed, the objects being to provide a cheap and durable machine of simple construction that will crush the seed easily without grinding it and destroying its fertilizing qualities, that can be run steadily with little power, and that needs no attention from the operator of the gin to which it is attached. These objects I attain by the construction and novel combinations of parts hereinafter described, embraced in the appended claims, and illustrated in the accompanying drawings, in which—

Figure 1:
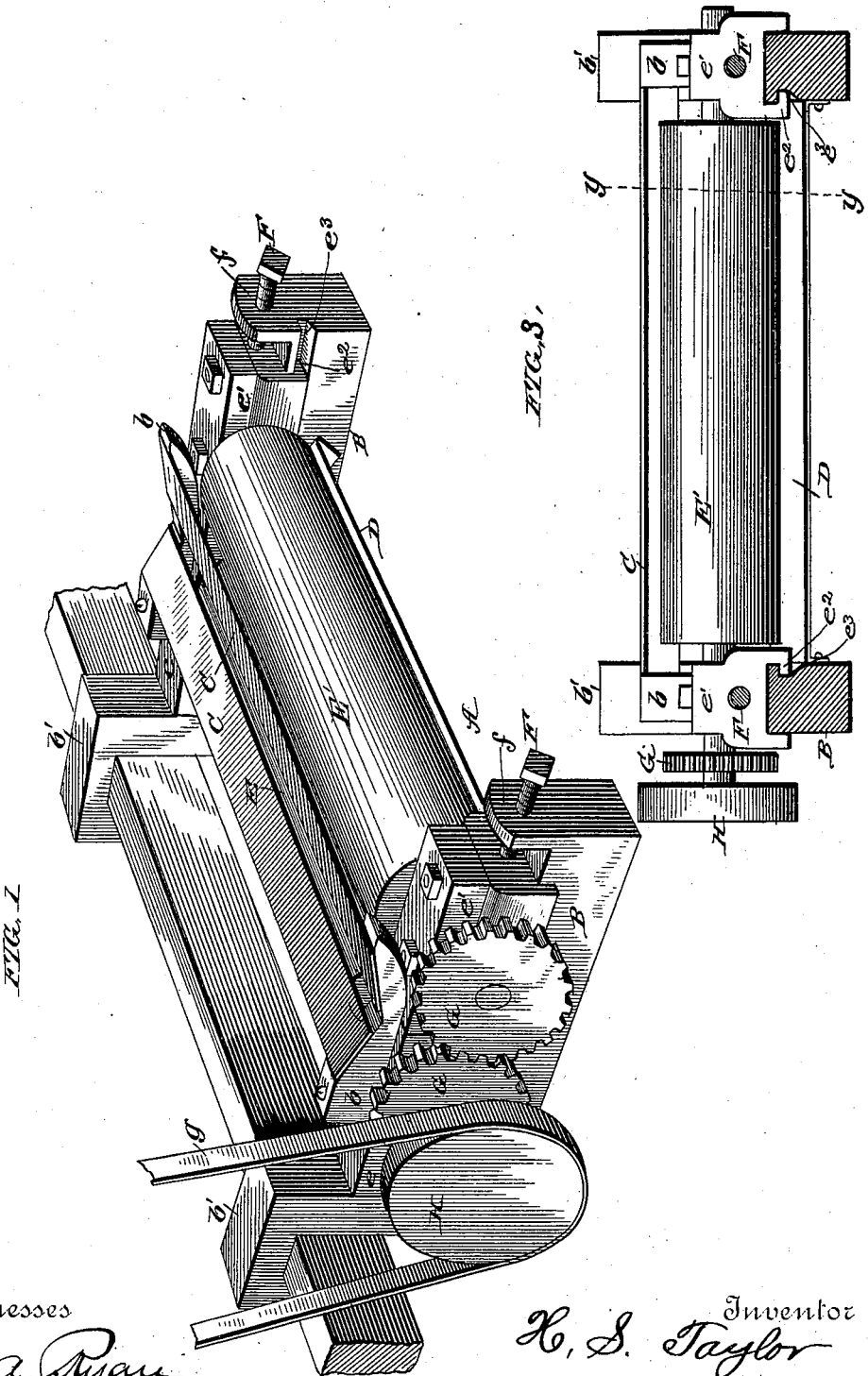
Figure 2:
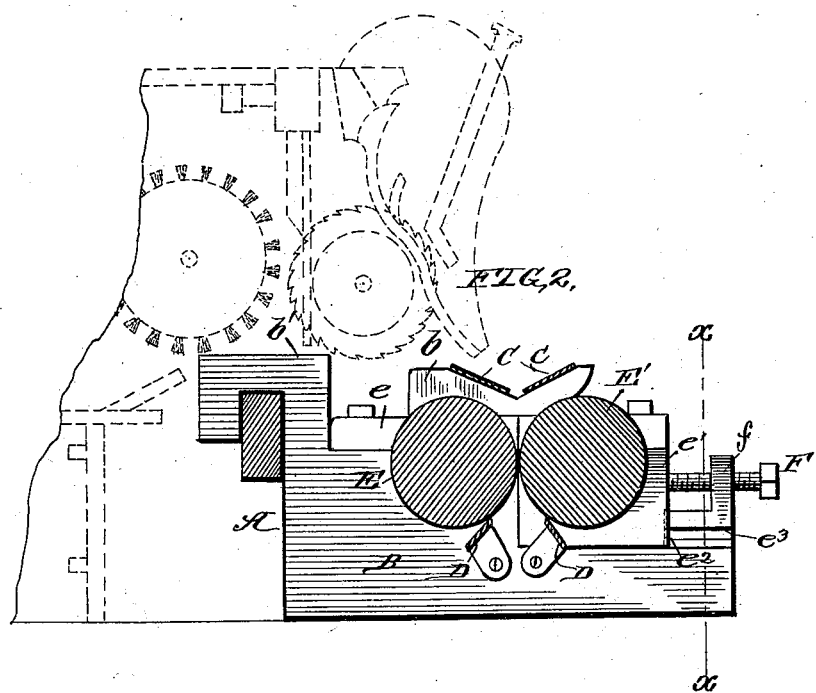

Figure 1 represents a perspective view of the machine. Fig. 2 represents a transverse section on the line *y y* of Fig. 4. Fig. 3 is a section on the line *x x*, Fig. 2.

Referring to the drawings by letter, A designates the main frame of the machine, provided with the similar end pieces, B B.

*b' b'* are upwardly-extending hook-shaped projections on the sides of the end pieces, B, adjacent to the gin, upon the beam of which, just below the gin-breast, the said projections engage and fit to keep the machine in proper position.

Upon the upper edges of the end pieces, B, adjacent to the projections *b'*, I rigidly secure the bearings *e*, and upon these bearings *e*, I secure at one end the blocks *b b*, which project therefrom and overhang the movable bearings *e'*, hereinafter referred to. These blocks *b b* have shallow V-shaped notches in their upper edges, near their outer ends, and the guide-plates C C have their ends secured in said notches.

D D are scraper-plates having their ends bent downward and secured to the inner surfaces of the end pieces.

As just stated, the blocks *b b* are each provided with a large shallow V-shaped notch, upon the edges of which the ends of the guide-plates C C are secured, so that the said plates form a sort of hopper to guide the seed falling upon them from the gin to the crushing-rollers, hereinafter described.

E E' are two similar rollers situated below the guide-plates and receiving the seed therefrom. The journals of the roller E turn in the fixed bearings *e*, secured on the upper edges of the pieces B adjacent to the hook-like projections, as shown. The journals of the roller E' turn in movable bearings *e'*, the lower edges of which bearings are grooved and ride upon the upper edges of the end pieces, B, the said end pieces being cut down at their points of support for the bearing-blocks, in order to bring the two rollers E E' on the same level. Each bearing-block has upon its lower inner edge an inwardly-standing flange, $e^2$, which rests under a rib, $e^3$, on the inner surface of the corresponding end piece B, and keeps the bearing-block down in position.

When placing the several parts of my device together, the bearings *e'* are first placed in position by being made to engage the inner end of the ribbed portion of the end pieces and then slid toward the outer end of the same. The bearings *e* and the other devices are then secured in position, as will be readily understood.

F F are adjusting-screws, which pass through threaded openings in the uprights *f f*, which rise from the outer ends of the pieces B. By means of said screws impinging on the bearing-blocks the roller E' can be held up to the roller E, so as to work therewith in crushing the seed, as will be apparent on reference to Figs. 1 and 2. If it is desired to stop the operation of seed-crushing, the screws F are disengaged from the bearing-blocks and the latter moved outward, so as to disengage the rollers without detaching the crushing-machine from the gin.

The scraper-plates D remove any bruised and crushed seed that may adhere to the rollers.

G G are similar intermeshing gear-wheels on the extended journals of the rollers, and H is a pulley on the journal or shaft of the roller E outside of the gear-wheel. The said roller is run by a belt, *g*, from any suitable pulley on the gin. When the rollers are wood, they are made solid; but when of cast metal they are made hollow and their shafts extend through them, having the journals on their ends. When the seeds fall crushed from the rollers, they drop into any proper receptacle placed below.

From the foregoing description it is evident that the machine is simple, strong, cheap, compact, and durable; that it requires but little power to run it continuously; that it needs no overlooking, and that the operation of crushing can be stopped without detaching the machine from the gin.

Having described my invention, I claim—

The combination, with the end pieces, B, of the bearings $e$, secured thereupon, the overhanging blocks $b$, secured at one end of each upon said bearings and projecting from the same, and having shallow V-shaped notches in their upper edges, the guide-plates C C, having their ends secured in said notches, the bearings $e'$, adjustably mounted on the end pieces, the rollers E E', arranged below said guide-plates, the roller E being journaled in the fixed bearings $e$, and the roller E' being journaled in the adjustable bearings $e'$, sliding on the end pieces to adjust the roller E' to and from the roller E and under and away from the guide-plates, and mechanism for operating said rollers, substantially as specified.

In testimony that I claim the foregoing as my own I have hereto affixed my signature in presence of two witnesses.

HILLIARD SHADRACH TAYLOR.

Witnesses:
R. F. TAYLOR,
M. REES BRYAN.